United States Patent
Stritzl et al.

(12)

(10) Patent No.: US 6,237,469 B1
(45) Date of Patent: May 29, 2001

(54) GAS POWERED PRESSURELESS STEAM COOKER

(75) Inventors: Josef Stritzl, Woodridge; Alexander Abidor, Richmond Hill; Edward A. Mueller, Aurora, all of (CA)

(73) Assignee: Crown Food Service Equipment Ltd., Downsview (CA)

( * ) Notice: Subject to any disclaimer, the term of this patent is extended or adjusted under 35 U.S.C. 154(b) by 0 days.

(21) Appl. No.: 09/563,359

(22) Filed: May 3, 2000

(51) Int. Cl.$^7$ .............................. A23L 1/00; A47J 27/04; F22B 7/00; F22B 37/26

(52) U.S. Cl. ............................. 99/330; 99/467; 99/448; 99/476; 99/483; 99/516; 126/20.1; 126/369; 126/369.2; 219/401

(58) Field of Search .................. 99/330, 331, 337, 99/339, 340, 357, 417, 448, 467, 473–476, 481, 483, 516; 122/145; 126/391.1, 377.1, 20, 20.1, 20.2, 21 A, 34, 369, 369.1, 369.2, 348, 360.2, 273 R, 91 A; 165/180; 219/401, 492; 392/401, 402; 432/209

(56) References Cited

U.S. PATENT DOCUMENTS

| | | | |
|---|---|---|---|
| 2,666,427 | * | 1/1954 | Keating .............................. 126/391.1 |
| 3,186,402 | * | 6/1965 | File ..................................... 126/377.1 |
| 3,820,524 | * | 6/1974 | Buckell .................................. 126/20 |
| 4,281,636 | * | 8/1981 | Vegh et al. .......................... 99/467 X |
| 4,460,822 | * | 7/1984 | Alden et al. ........................... 219/401 |
| 4,495,932 | * | 1/1985 | Bratton ................................ 99/483 X |
| 4,552,123 | * | 11/1985 | Birkner et al. .......................... 99/467 |
| 4,817,582 | * | 4/1989 | Oslin et al. ......................... 99/474 X |
| 5,103,800 | * | 4/1992 | Bedford et al. .................. 219/401 X |
| 5,178,125 | * | 1/1993 | Kuen ................................. 99/467 X |
| 5,549,038 | * | 8/1996 | Kolvites ................................. 99/330 |
| 5,617,839 | * | 4/1997 | Jennings et al. ................... 99/476 X |
| 5,732,614 | * | 3/1998 | Oslin ................................. 99/476 X |
| 6,000,392 | | 12/1999 | Stritzl et al. . |

* cited by examiner

Primary Examiner—Timothy F. Simone
(74) Attorney, Agent, or Firm—Ridout & Maybee

(57) ABSTRACT

A gas powered pressureless steam cooker comprises at least one cooking compartment having a steam inlet, at least one steam generator located in close proximity to the cooking compartment, and a connector device means connecting a steam outlet of the steam generator to the steam inlet of the cooking compartment. The steam generator comprises at least one inshot gas burner, and an integrated heat exchanger unit/firebox within a water reservoir, the integrated heat exchanger unit/firebox being in heat exchange relationship with water within the water reservoir to create steam from water. The heat exchanger unit comprises a substantially S-shaped tube having a lower horizontal leg, a middle horizontal leg, an upper horizontal leg, a lower vertical web spacing the lower horizontal leg below the middle horizontal leg, and an upper vertical web spacing the middle horizontal leg below the upper horizontal leg. The upper vertical web forms a chamber communicating with a front end of the upper leg and a front end of the middle leg, and is provided with a horizontal channel extending through the chamber from side to side orthogonal to the axis of the upper horizontal leg. Preferably, the steam cooker comprises a ten or twelve tray cooker having two compartments stacked one on top of the other or side-by-side, each compartment being served by one steam generator. The steam generators are preferably independently operable and are mounted side by side in a base compartment below the cooking compartments.

17 Claims, 4 Drawing Sheets

GAS POWERED PRESSURELESS STEAM COOKER

FIELD OF THE INVENTION

This invention relates to gas powered pressureless steam cookers, especially to gas powered steam cookers for commercial or restaurant use. The term "pressureless steam cooker" as used herein is intended to mean a steam cooker in which no great pressure of steam is developed, although minor pressure of up to about ½ lb. per square inch may be permissible.

BACKGROUND OF THE INVENTION

Steam cookers conventionally cook foods by the use of hot steam and may be powered by a steam generator which is either gas fired or electrically powered. Large steam cookers for commercial or restaurant food preparation typically comprise one or more large cooking compartments mounted on top of a base compartment containing a gas or electric steam generator, sometimes referred to as a "boiler". Typically, each compartment of a large steam cooker has dimensions sufficient to accept five or six trays, each tray having a depth of about 2½ inches. Most typical steam cookers have two such cooking compartments, mounted one on top of the other, bringing the total capacity of the steam cooker to ten or twelve trays. In order to provide sufficient heating capacity to quickly and completely cook large amounts of food, a powerful steam generator is required. Conventional steam generators of this type are relatively bulky, and typically only one such steam generator will fit into a 24 inch wide base compartment typical of such steam cookers.

Although a single steam generator, typically having a heat output of about 240 kBTU/hr, is sufficient for a ten or twelve pan steam cooker, such steam generators have a number of disadvantages. Firstly, the steam generator consumes the same amount of fuel regardless of whether one or both of the compartments are being used, resulting in a considerable waste of fuel during times when the steam cooker is not being used to its full capacity. Secondly, steam generators of this type tend to be relatively inefficient, having an efficiency of about 50% based on the amount of heat produced from a given amount of fuel. In order to meet efficiency standards in some jurisdictions, it may be necessary for such steam generators to be outfitted with relatively expensive devices to recapture heat which would otherwise be wasted.

Other types of steam generators have been developed which are more compact and more efficient than the conventional steam generator described above. For example, U.S. Pat. No. 6,000,392 discloses a steam cooker in which one steam generator is provided for each cooking compartment, and in which the steam generators are sufficiently small to allow them to be arranged in side-by-side relation to the cooking compartments. This type of steam generator has an efficiency of about 70%, considerably higher than that of conventional steam generators, and generates a large amount of high quality steam in relation to its size. However, the heat output of this type of generator is limited, and therefore it is used primarily in smaller steam cookers in which one such generator supplies steam to a single compartment having a capacity of three pans.

Therefore, the need exists for a more compact, efficient steam generator for large capacity steam cookers.

SUMMARY OF THE INVENTION

The above-mentioned problems of the prior art have been overcome by the present invention, which provides a gas powered pressureless steam cooker having one or more cooking compartments and one or more steam generators, with each steam generator serving one cooking compartment.

The steam generator according to the invention has an efficiency of about 80%, greater than the efficiencies of either of the prior art steam generators discussed above. The greater efficiency of the steam generator according to the present invention is provided by a unique steam generator design, which utilizes inshot burners and a heat exchanger unit in the form of an S-shaped heat exchanger tube.

Furthermore, the steam generator of the invention has a heat output which is significantly greater than that provided by the steam generator described in U.S. Pat. No. 6,000,392, with each steam generator of the invention being sufficiently powerful to meet the steam requirements of a five or six tray cooking compartment.

In addition, the compact size of the steam generator of the invention permits two steam generators to be mounted in a base compartment of a large capacity ten or twelve tray steam cooker. As the steam generators are operated independently of one another and each serve one cooking compartment, fuel consumption is effectively cut in half when only one compartment is being used.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 1:
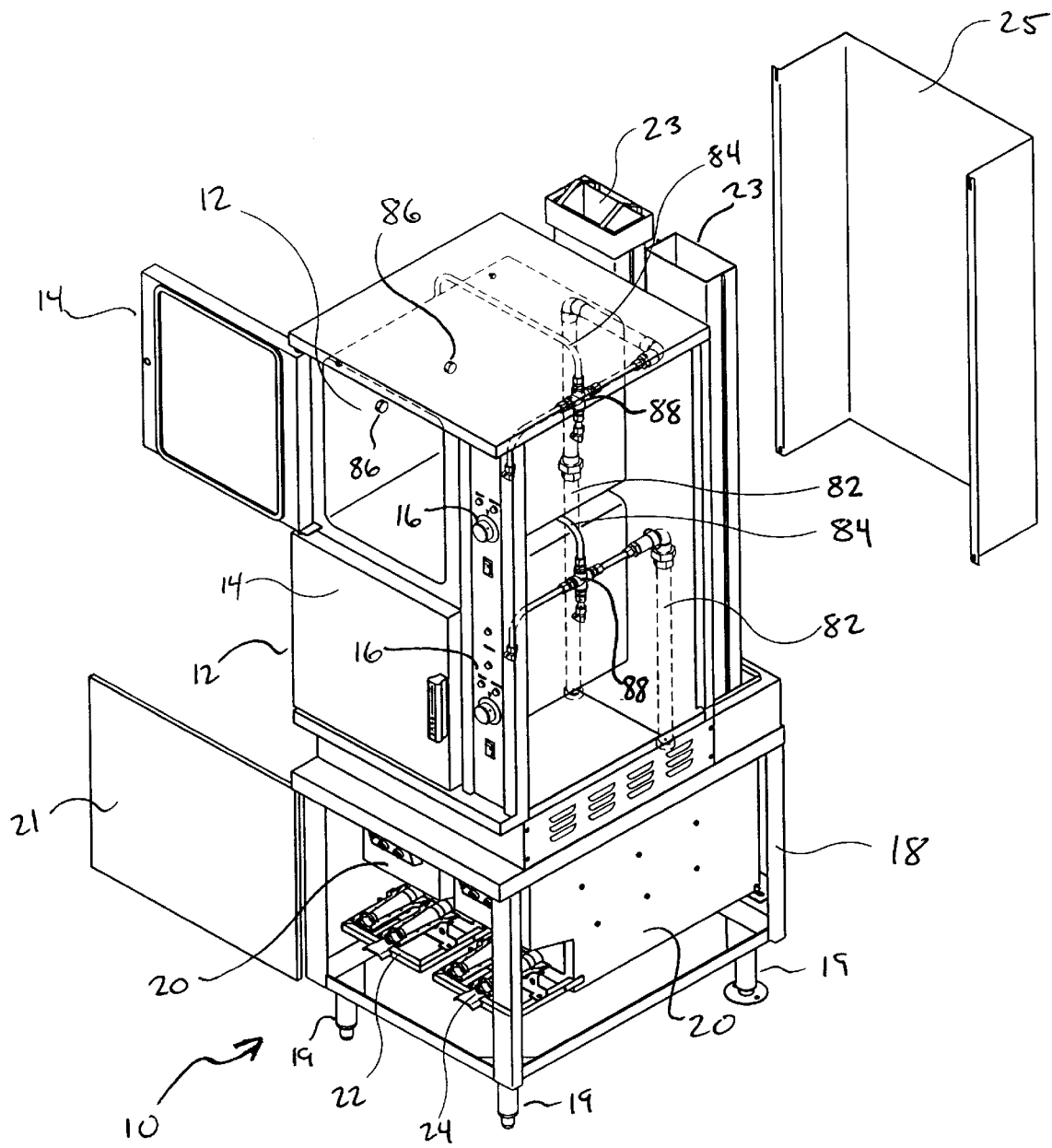
FIG. 1 is a partially cut away, perspective view of a preferred two compartment steam cooker according to the present invention, taken from the front and the right side of the cooker, showing the back cover of the cooker removed.
Figure 2:
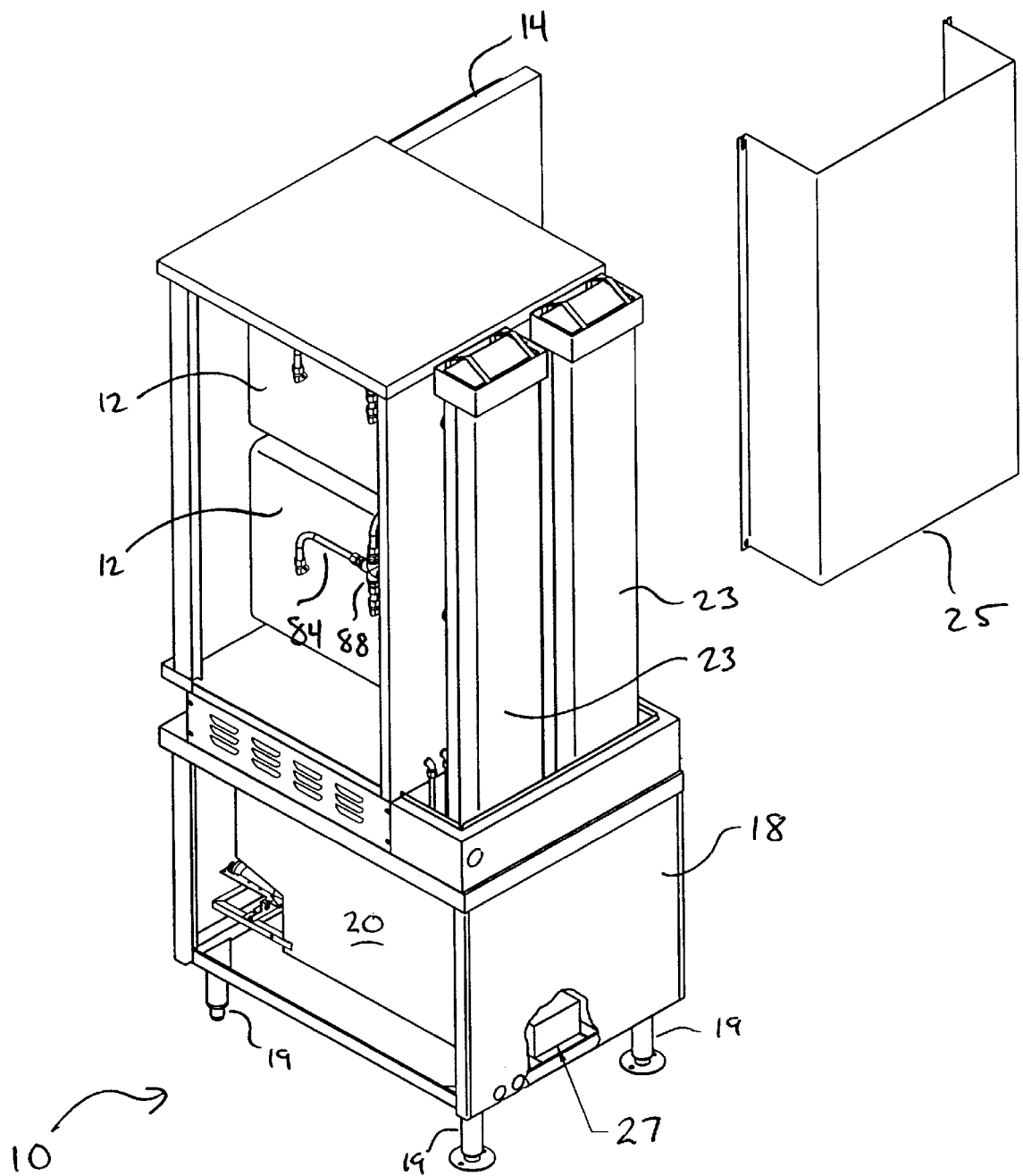
FIG. 2 is a partially cut away, perspective view of the steam cooker of FIG. 1, taken from the rear and the right side, and with the back cover of the cooker removed.

FIGS. 1 and 2 show a preferred steam cooker 10 according to the invention having two cooking compartments 12 stacked one on top of the other. The side panels covering the right side of the cooker 10 are shown as being removed in order to more clearly illustrate the components making up cooker 10. Each cooking compartment 12 has internal racks (not shown) to enable a number of trays to be slid in and out of the compartment. The compartments 12 are opened and closed by means of doors 14 mounted on the front of the steam cooker 10, with controls 16 for each compartment 12 also being located on the front of the steam cooker 10. The controls 16 preferably include power switches, timers and indicator lights.

Preferably, steam cooker 10 is a large capacity ten or twelve tray cooker, with each compartment 12 being capable of accepting five or six rectangular, flat-bottomed trays (not shown) having a depth of about 2½ inches.

The two cooking compartments 12 are mounted on top of a cabinet base compartment 18 which houses two steam generators 20 located in side-by-side relation to one another. Access to base compartment 18 is provided by door 21. Base compartment 18 preferably has a width of about 24 inches, about the same as that of cooking compartments 12, in order to minimize floor space taken up by steam cooker 10. As shown in FIG. 1, base compartment 18 may preferably have a length of about 33 inches, and a height of about 28 inches from the floor, including its legs 19.

Although the preferred steam cooker 10 shown in the drawings has two compartments 12 and two steam generators 20, it will be appreciated that the principles of the present invention could be applied to steam cookers having one compartment and one steam generator, and to steam cookers having greater than two compartments and greater than two steam generators. Preferably, each steam generator supplies steam to one compartment, and is operated independently of the other steam generator(s).

As shown in FIGS. 1 and 2, the cooker 10 also comprises a pair of risers 23 through which spent exhaust gases flow upwardly into a ventilation hood (not shown). Preferably, the exhaust gases flow through natural convection, without the assistance of a fan or the like. In use, the risers 23 are covered by a back cover 25 of the cooker 10 which is removed in FIGS. 1 and 2 to show the risers 23. The cooker 10 also includes a cooling and drain box 27 which captures, cools and drains away the condensate and low temperature steam from the steam generators 20. As shown in FIG. 2, the cooling and drain box 27 is preferably located inside base compartment 18 below and between the steam generators 20. Pipes (not shown) through which the condensate and low temperature steam pass to the cooling and drain box 27 preferably pass downwardly through a space between the steam generators 20.

The following is a detailed description of the steam generator 20.

Each steam generator 20 comprises a left burner 22, a right burner 24, an integrated heat exchanger unit/firebox 26, and a water reservoir 28 having a steam outlet 30 on an upper wall 32 thereof. The integrated heat exchanger unit 26 is enclosed within reservoir 28 and is in heat exchange relationship with water to create steam which exits the steam generator through steam outlet 30.

The burners 22 and 24 of steam generator 20 are preferably inshot burners of the type described in U.S. Pat. No. 5,186,620 to Hollingshead. Such burners are relatively small in comparison with their BTU/hr output. The gaseous fuel and primary air are mixed at the beginning of the burner inlet. When the flame exits at the end of the burner nozzle, it is mixed with secondary air to form an extremely hot flame cone. Preferably, the fuel comprises natural gas or propane.

Figure 3:
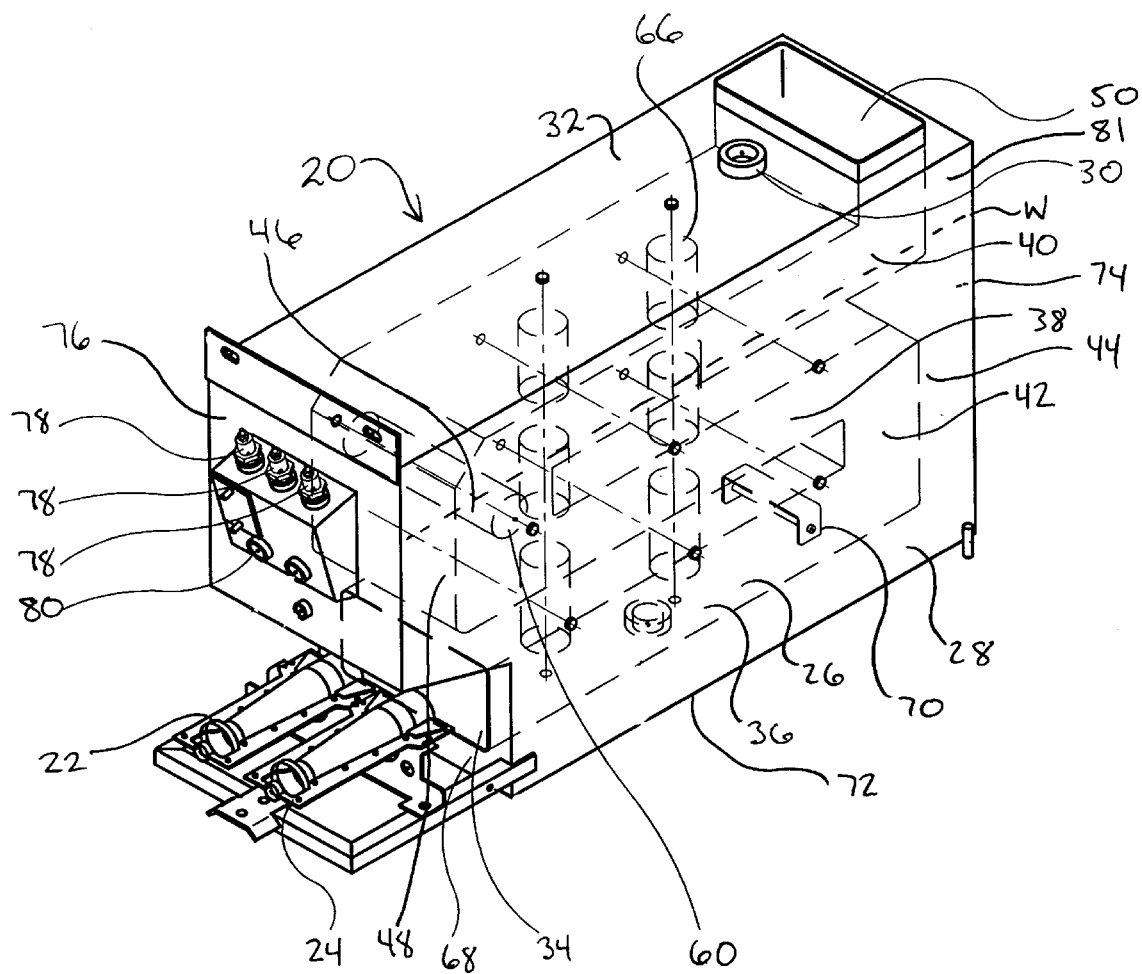
FIG. 3 is a perspective view showing one of the steam generators of the steam cooker of FIG. 1.

The left and right burners 22 and 24 (identical) are mounted in side-by-side relation to one another and, as shown in FIG. 3, are directed into the generally vertical mouth 34 of heat exchanger unit 26. Preferably, the burners 22 and 24 are spaced from one another side-by-side so that the flames produced by the burners 22 and 24 are close to the sides of the heat exchanger unit 26 to provide maximum efficiency.

Figure 4:
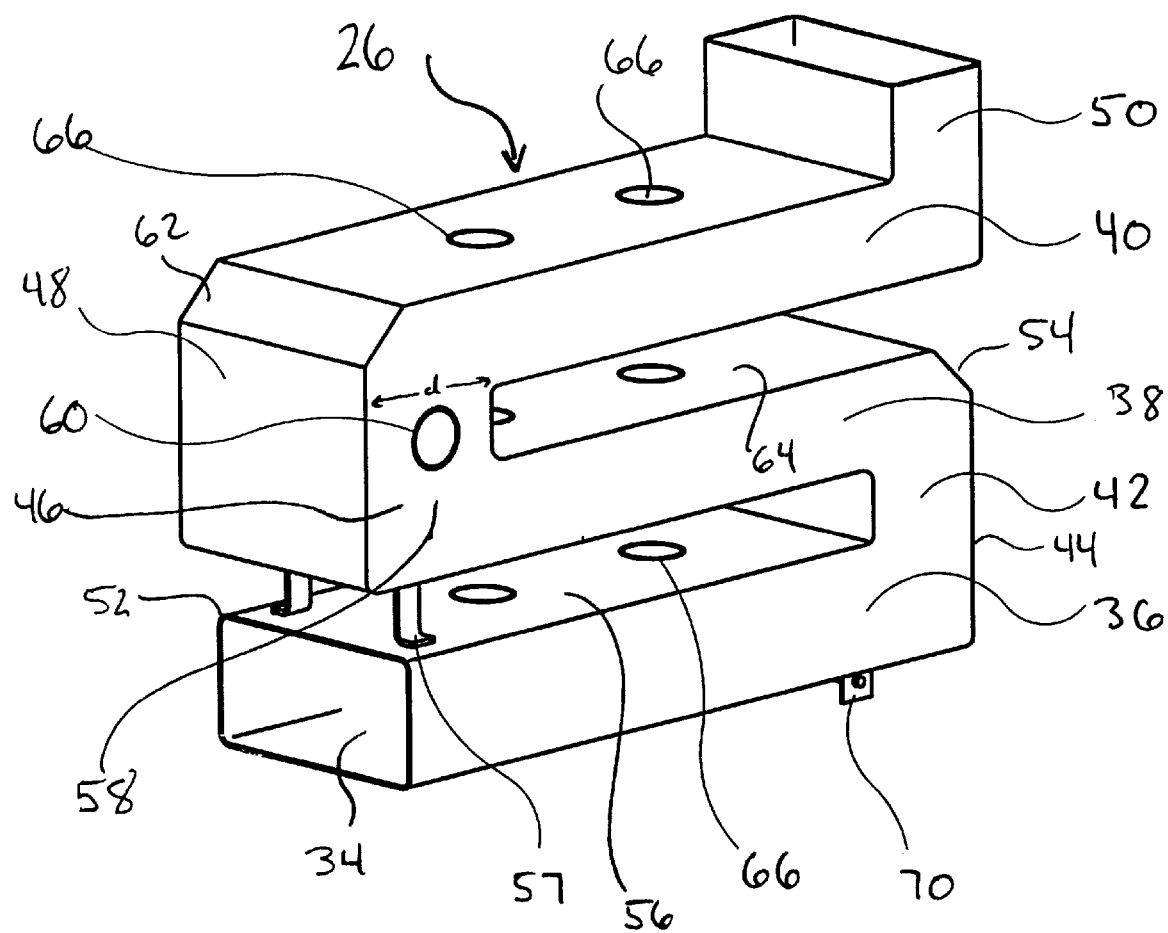
FIG. 4 is a perspective view of the heat exchanger unit of one of the steam generators of FIG. 1.

The heat exchanger unit 26, shown in isolation in FIG. 4, has three horizontal legs, a lower horizontal leg 36, a middle horizontal leg 38 and an upper horizontal leg 40. The heat exchanger unit 26 further comprises a pair of vertical webs which space the horizontal legs from one another. A lower vertical web 42, located to the rear 44 of the heat exchanger unit 26, spaces the lower horizontal leg 36 below the middle horizontal leg 38. An upper vertical web 46, located adjacent the front 48 of heat exchanger unit 26, spaces the middle horizontal leg 38 below the upper horizontal leg 40. The heat exchanger unit 26 formed by horizontal legs and vertical webs is substantially S-shaped.

The rear end of the upper horizontal leg 40 opens into a vertically extending flue outlet 50, which extends about ¾ to about ⅞ inch above the upper wall 32 of reservoir 28, for insertion into the lower ends of risers 23. Therefore, the hot combustion gases produced by burning the fuel pass completely through the S-shaped heat exchanger unit 26 from mouth 34 to flue 50, transferring heat to the water surrounding heat exchanger unit 26.

The horizontal legs of heat exchanger unit 26 are preferably formed of stainless steel and have a rectangular cross section, with the widths of the horizontal legs being greater than their height. The stainless steel units are preferably formed by bending plate into the desired shape to have rounded corners, as shown at 52, and joining the edges of the bent plate together with a weld. Alternatively, the heat exchanger unit 26 can be formed by stamping two sections of sheet metal which are subsequently bent and welded together.

The lower horizontal leg 36 not only forms part of the heat exchanger unit 26 but also acts as a firebox tube for the inshot burners 22 and 24. In a particularly preferred example of a heat exchanger unit 26, the lower horizontal leg 36 has a height of about 3½ inches, a width of about 6¾ inches, and a length measured from mouth 34 to rear 44 of heat exchanger unit 26 of about 19 to 20 inches.

The lower vertical web 42 directs the flame into the middle horizontal leg 38, with the process of combustion being substantially complete by the time the gases reach the front end of middle leg 38. In addition, a large amount of heat is generated at the rear 44 of heat exchanger unit 26 as the gases pass from lower leg 36 to middle leg 38 through vertical web 42. The lower vertical web 42 is preferably provided with a deflecting wall 54 at its upper corner to deflect gas flow in the desired direction of travel through middle leg 38. The preferred angle of deflection is about 45°. Rather than a chamfered deflecting wall 54, lower vertical web 42 may instead be provided with a rounded deflecting wall at its upper corner to deflect the gas flow. Preferably, the lower vertical web has a depth, measured from front to rear, of about 3½ inches, and forms a gap 56 of about 2 inches between lower leg 36 and middle leg 38. The spacing of gap 56 is preferably maintained by a spacer bracket 57 provided between legs 36 and 38.

The middle horizontal leg 38 is preferably formed of a rectangular tube having a width of about 6¾ inches and a height of about 2¾ inches, and a length measured from front 48 to rear 44 of about 21 inches.

As mentioned above, the combustion process is substantially complete by the time the gases reach the front end of middle leg 38. Therefore, once the gas reaches this point, it is desirable to extract as much heat as possible from the spent combustion gases. In the steam (generator 20 of the present invention, this is accomplished by passing the hot combustion gases into an enlarged chamber 58 formed by upper vertical web 46 at the front ends of the upper leg 40 and middle leg 38, and then through upper leg 40.

As shown in FIG. 4, a horizontal tube 60 extends through the chamber 58 from side to side in a direction orthogonal to the axis of upper leg 40. Preferably, horizontal tube 60 is substantially centrally located in chamber 58, functioning as a stay between the sides of the heat exchanger unit 26 and increasing the heat exchange surface of the unit 26. Another important function of horizontal tube 60 is to create turbulence inside chamber 58, resulting in a slowing of the flow of combustion gases through the unit 26 and thereby increasing the residence time of the gases inside the unit 26. This permits a maximum amount of heat to be extracted from the gases as they pass through the upper horizontal leg 40 and into the flue outlet 50.

In a particularly preferred embodiment of the invention, the depth of chamber 58 formed by upper vertical web 46, measured from front to rear along line d in FIG. 4, is about 4½ inches. The vertical height of chamber 58, measured from the bottom of middle leg 38 to the top of upper leg 40, is about 7½ inches, with horizontal tube 60 having a diameter of about 1½ inches and being positioned at or close to the center of chamber 58.

The upper vertical web 46 is preferably also provided with a deflecting wall 62 at its upper corner to deflect gas flow through upper leg 40. The preferred angle of deflection is about 45°. As discussed above with reference to deflecting wall 54, the deflecting wall of upper vertical web 62 may be rounded instead of chamfered. Preferably, upper horizontal leg 40 has a width and height identical to those of middle leg 38, and a length measured from front 48 to the rear of flue outlet 50 being about 22 inches. Preferably, a gap 64 of about 2 inches is provided between middle leg 38 and upper leg 40.

As shown in FIGS. 3 and 4, each of the horizontal legs of heat exchanger unit 26 is also provided with two vertically extending tubes 66 forming water passages through the legs. Preferably, tubes 66 are aligned to form continuous passages from the lower leg 36 through the upper leg 40. The tubes 66 act as stays and also provide increased heat exchange surface. Preferably, vertical tubes 66 are produced from tubing having an outside diameter of about 1½ inches.

The orientation of the heat exchanger unit 26 within the reservoir 28 is also important. The heat exchanger unit 26 should be spaced from the bottom of the reservoir 28 to minimize build up of lime scale. The spacing may preferably be from about ¾ inch to 1½ inch, although greater spacing is possible. The spacing is maintained by welding the lower horizontal leg 36 of the heat exchanger unit 26 to the front wall 68 of the reservoir 28 in the vicinity of mouth 34, and providing a spacer 70 between the rear end of lower horizontal leg 36 and the bottom wall 72 of reservoir 28, and by welding the exhaust flue outlet 50 to the upper wall 32 of reservoir 28 where it exits.

Furthermore, the spacing between the front 48 and rear 44 of heat exchanger unit 26 and the walls of the reservoir 28 is increased in the proximity of the lower vertical web 42 and the upper vertical web 46, to allow greater amounts of water to collect in these areas of high heat transfer. Specifically, the spacing between the rear 44 of lower vertical web 42 and the rear wall 74 of the reservoir 28 is about 2 inches. Furthermore, the front wall 68 of reservoir 28 is provided with a forwardly projecting portion 76 adjacent the upper vertical web 46, with a spacing between the forward portion 76 and the front 48 of web 46 being about 3½ inches.

The forwardly extending portion 76 of reservoir 28 is provided with a plurality of probes 78 which indicate the water level inside reservoir 28. Preferably, three such probes are provided to sense no water, low water and full (operating level) situations. The probes 78 are enclosed within a stainless steel control box 80 in order to prevent them from being affected by turbulence inside reservoir 28. Control box 80 also provides reinforcement for the front wall 76 of the generator 20.

In a particularly preferred embodiment of the invention, the water reservoir has a total length, measured from the front of portion 76 to rear wall 74, of about 26½ inches, a total height from bottom wall 72 to upper wall 32 of about 16 inches and a side to side width of about 8¾ inches. These dimensions also correspond substantially to the dimensions of the steam generator as a whole. The compact nature of the steam generator permits two such generators to easily fit side-by-side within the 24 inch wide base compartment 18 of steam cooker 10.

The S-shaped heat exchanger unit 26 provides efficient transfer of heat from the burning fuel to the water inside reservoir 28. Direct heat transfer to the water is provided by all vertical and horizontal surfaces of the heat exchanger unit 26, with the exception of the upper surface of the upper horizontal leg 40, since the water level inside reservoir 28 is preferably below the upper surface of upper horizontal leg 40, and is more preferably slightly above the lower surface of upper horizontal leg 40. For example, the water level may be as indicated by line W in FIG. 3. Thus, a steam space 81 is formed in the portion of steam generator 20 which is above water level W.

The steam which collects in the space 81 is superheated by contact with the exposed surfaces of upper horizontal leg 40 and the surfaces of the flue outlet 50 which are located inside the reservoir 28. Specifically, heating of the generated steam along the entire length of leg 40, combined with the positioning of the steam outlet 30 at the rear end of leg 40, results in superheating of the steam to at least about 103° C. or 217.4° F. as it exits the steam outlet 30. Superheating increases the dryness of the steam, making it more effective for cooking. Furthermore, a water deflector (not shown) is preferably provided to prevent water droplets in the steam space 81 from exiting the generator through outlet 30.

The steam outlet 30 of each steam generator 20, which may be formed by a ¾ inch inside diameter pipe fitting, is connected through short lengths of pipe and/or tubing to one or more nozzles inside the cooking compartment 12. In the preferred cooker 10 shown in the drawings, the steam flows from outlet 30 into a ¾ inch pipe 82, and then through minimum ⅜ inch diameter tubing 84 to the nozzles 86 of a cooking compartment 12. It will be appreciated that diameters other than those specified above are possible for some sizes of steam generators and cookers. It will also be appreciated that pipe 82 and tubing 84 can be replaced by flex hoses or the like in order to simplify assembly and service maintenance operations.

Each cooking compartment 12 is shown as having inlet nozzles 86, with the flow of steam being split by fittings 88 to provide steam at each nozzle 86. Preferably, each nozzle has four orifices. Since the steam cooker is essentially a pressureless cooker, the nozzles must not be so constricting that there is undue build up of pressure. The pressure is preferably not greater than ½ pound. The choice of nozzle diameter is dependent on the pressure build up desired. For example, a suitable minimum nozzle diameter might be 7/32 inch.

After the combustion gases pass through the heat exchanger unit 26 and exit flue outlet 50, they travel vertically through a riser 23 to be exhausted into a ventilation hood. In order to further improve efficiency of the steam generator, a heat recovery device may be installed in the riser 23 above flue outlet 50 in order to capture some of the heat contained in the exhausted gases. Such a device may preferably comprise a copper U-tube having a diameter of from up to ⅜ inch to ½ inch which is installed on the riser outside surface. In addition, one leg of the U-tube may be inserted into the inside wall of the riser to provide additional heat recovery. However, it is to be understood that the recovery of heat from the exhaust gas is not necessary, as the steam generator of the present invention achieves an efficiency of about 80%, considerably higher than that of prior art steam generators, and is capable of meeting combustion standards in most jurisdictions. In other words, each of the steam generators of the invention consume about 70.5 kBTU/hr of fuel. Therefore, a ten or twelve pan steam cooker according to the invention will have a fuel consumption of 141 kBTU/hr with both generators operating. This is significantly less than the 240 kBTU/hr of the steam generator used in conventional steam cookers, described above. Furthermore, the emissions of carbon monoxide produced by the steam generator are very low, and well within standards. For example, during the first two minutes of operation, carbon monoxide levels in the exhaust gases were up to 100 to 120 ppm, then falling to the range of about 38 to 85 ppm. Present standards require carbon monoxide levels to be not more than 800 ppm.

Although the invention has been described in connection with certain preferred embodiments, it is not intended to be limited thereto. Rather, the invention is intended to include all embodiments which may fall within the scope of the following claims.

What is claimed is:

1. A gas powered pressureless steam cooker, comprising:

at least one cooking compartment having at least one steam inlet for steam to enter the cooking compartment;

at least one steam generator having a steam outlet in communication with the steam inlet of the cooking compartment, the steam generator being located in close proximity to the cooking compartment and comprising at least one inshot burner, at least one integrated heat exchanger unit and firebox, and a water reservoir in which said steam outlet is located, the integrated heat exchanger unit and firebox being contained within the reservoir and being in heat exchange relationship with water within the water reservoir to create steam from water, the heat exchanger unit opening in a generally vertical mouth, with the inshot burner being directed into said mouth; and connector means between said outlet and said steam inlet of said cooking compartment;

wherein said heat exchanger unit comprises a substantially S-shaped tube having a lower horizontal leg, a middle horizontal leg, an upper horizontal leg, a lower vertical web spacing the lower horizontal leg below the middle horizontal leg, and an upper vertical web spacing the middle horizontal leg below the upper horizontal leg, said vertical mouth of the heat exchanger unit being located at a front end of the lower leg;

and wherein the upper vertical web forms a chamber communicating with a front end of the upper leg and a front end of the middle leg, said chamber being provided with a horizontal channel extending through said chamber from side to side orthogonal to the axis of the upper leg.

2. The gas powered pressureless steam cooker as claimed in claim 1, wherein a length of the upper vertical web is greater than a height of the upper leg and the middle leg.

3. The gas powered pressureless steam cooker as claimed in claim 1, wherein a length of the upper vertical web is greater than a length of the lower vertical web.

4. The gas powered pressureless steam cooker as claimed in claim 1, wherein the lower leg, middle leg and upper leg each have a rectangular cross-section with a width to height ratio greater than 1.

5. The gas powered pressureless steam cooker as claimed in claim 4, wherein the width to height ratio is from about 1.9 to about 2.5.

6. The gas powered pressureless steam cooker as claimed in claim 1, wherein a height of the lower leg is greater than heights of the middle leg and the upper leg.

7. The gas powered pressureless steam cooker as claimed in claim 1, wherein at least one vertical channel passes upwardly through each of said legs.

8. The gas powered pressureless steam cooker as claimed in claim 1, additionally comprising an exhaust flue protruding from an upper surface of the reservoir and being connected to a rear end of the upper leg.

9. The gas powered pressureless steam cooker as claimed in claim 8, wherein the steam outlet is proximate the rear end of the upper leg.

10. The gas powered pressureless steam cooker as claimed in claim 1, wherein the steam generator has two inshot burners having a combined input of about 70 kBTU/hr.

11. The gas powered pressureless steam cooker as claimed in claim 1, comprising two of said cooking compartments and two of said steam generators.

12. The gas powered pressureless steam cooker as claimed in claim 11, wherein said cooking compartments are stacked one on top of the other, and the steam generators are located in side-by-side relation to one another immediately below the cooking compartments.

13. The gas powered pressureless steam cooker as claimed in claim 12, wherein each of said steam generators is connected to one of said cooking compartments through said connector means.

14. The gas powered pressureless steam cooker as claimed in claim 13, wherein said connector means comprises a tube having a diameter of from about 3/8 of an inch to about 5/8 of an inch.

15. The gas powered pressureless steam cooker as claimed in claim 1, wherein the lower and middle horizontal legs are completely surrounded by water and wherein a water level inside the reservoir is between upper and lower surfaces of the upper horizontal leg.

16. The gas powered pressureless steam cooker as claimed in claim 15, wherein the water level is slightly above the lower surface of the upper horizontal leg.

17. The gas powered pressureless steam cooker as claimed in claim 12, wherein the steam generators are contained in a base compartment having a width of about 24 inches.

* * * * *